Dec. 27, 1949  F. L. BOTELHO  2,492,460
VALVE FOR PRESSURE TREATING CHAMBERS
Filed June 6, 1945  2 Sheets-Sheet 1
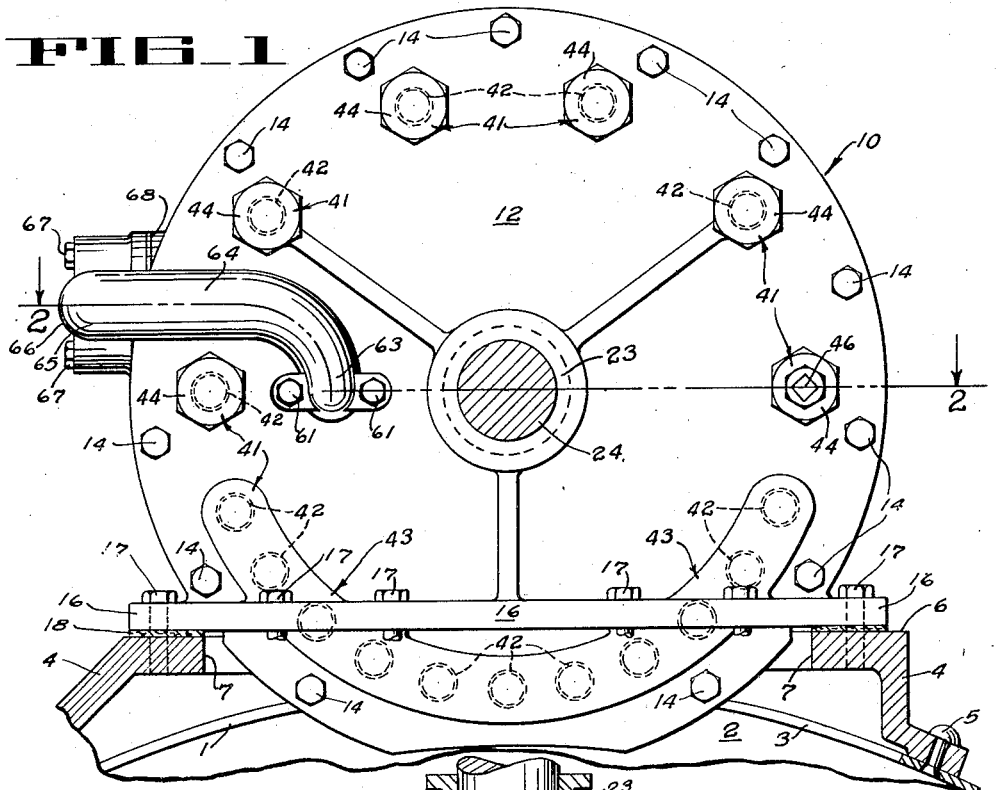
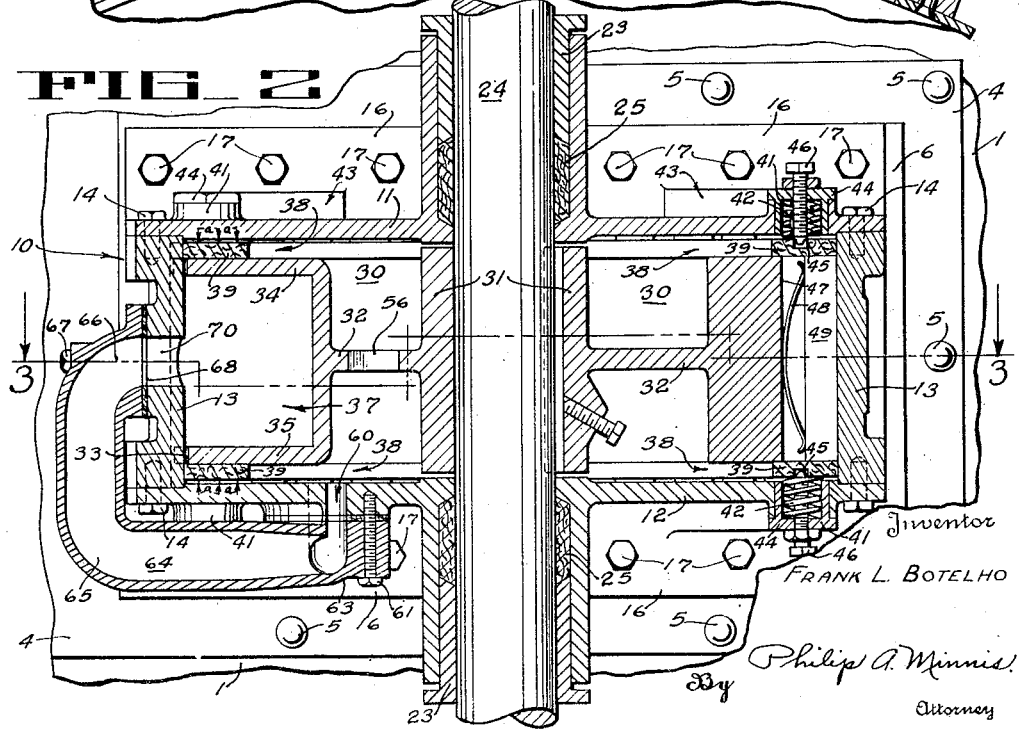
Inventor
FRANK L. BOTELHO
By Philip A. Minnis
Attorney Dec. 27, 1949         F. L. BOTELHO         2,492,460
VALVE FOR PRESSURE TREATING CHAMBERS
Filed June 6, 1945                2 Sheets-Sheet 2
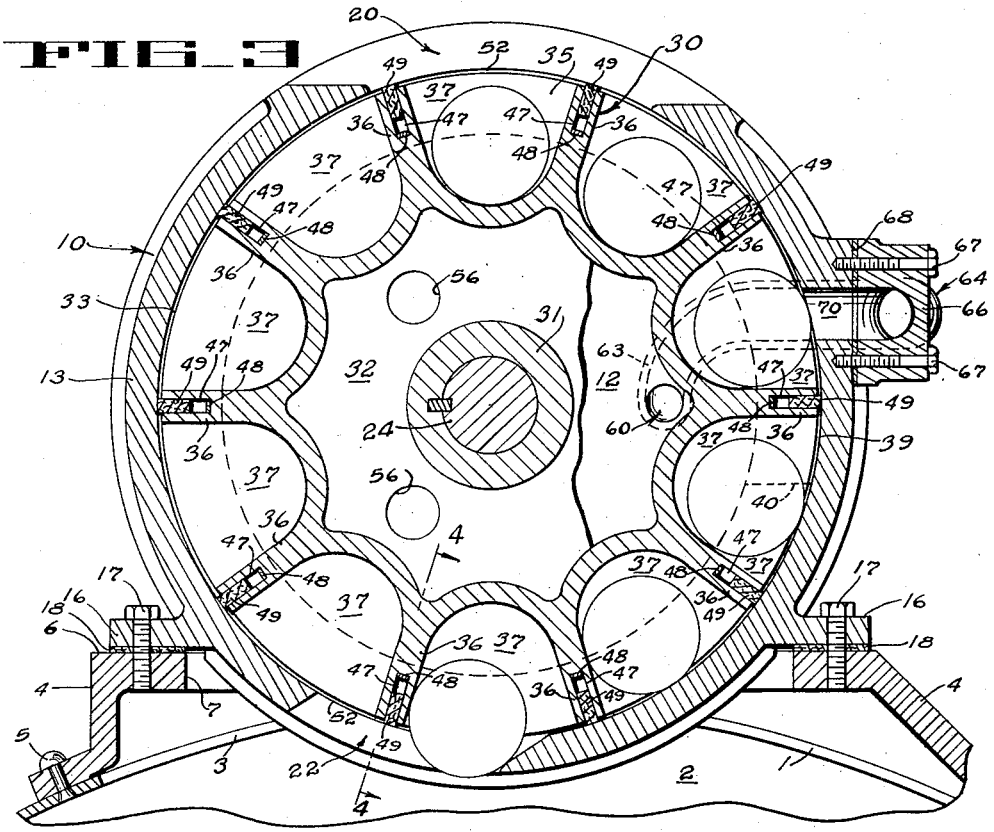
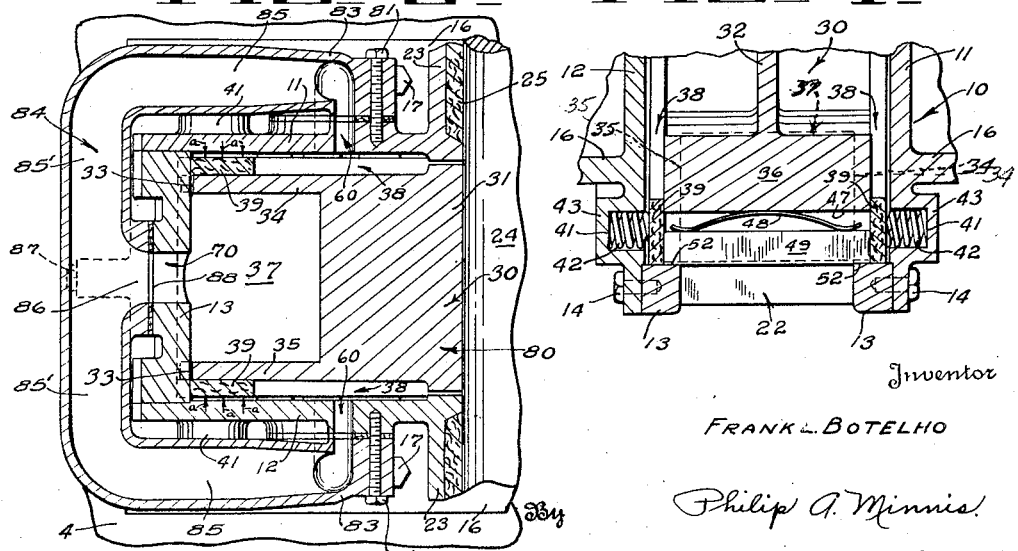
Inventor
FRANK L. BOTELHO
By Philip A. Minnis
Attorney Patented Dec. 27, 1949

2,492,460

UNITED STATES PATENT OFFICE 2,492,460

VALVE FOR PRESSURE TREATING CHAMBERS

Frank L. Botelho, San Jose, Calif., assignor to Food Machinery and Chemical Corporation, a corporation of Delaware Application June 6, 1945, Serial No. 597,892

6 Claims. (Cl. 198—211)

The present invention relates to rotary valve mechanisms for pressure treating chambers such as pressure cookers or the like. These rotary valve mechanisms are employed for admitting containers to the cooker or for discharging them therefrom and are of the general construction disclosed in Reissue Patent No. 15,334 issued to Albert R. Thompson on April 11, 1922.

Although valves of this type are provided with suitable sealing rings between the valve rotor or turret and the stationary valve housing to effect a pressuretight seal therebetween, an absolute seal against leakage of fluid under pressure cannot be effected especially when there is a substantial pressure differential between the treating chamber and the inlet portion of the valve housing. This leakage of fluid under pressure from the chamber to the valve housing tends to equalize the pressure between the treating chamber and the valve housing so that further leakage from the treating chamber to the valve housing is dependent upon slight leakage of pressure from the valve housing by way of the inlet of the valve housing.

This equalization of the pressure between the treating chamber and the valve housing, i. e. at the spaces intermediate the side walls of the housing and the turret, is objectionable since excessive pressure is exerted thereby against the sealing rings in the housing causing undue friction between the sealing rings and the valve turret. This friction between the sealing rings and the turret causes a brake-like action tending to retard the movement of the turret thus requiring considerable power in driving the turret to overcome the increased load caused by this brake-like action. The resulting wear between the turret and the sealing ring requires frequent replacement of the same. Likewise an increase in wear of the driving mechanism is caused by this brake-like action so that replacement of parts of the drive mechanism are often necessary.

The valve construction of the present invention has been designed with an object to overcome the above disadvantages by a simple valve construction which is economical in manufacture and highly efficient in use.

Another object of the present invention is to provide an improved valve construction in which fluid under pressure within the valve housing and intermediate the side walls and turret thereof is maintained at a minimum.

Another object is to provide an improved valve structure wherein excessive wear and tear of the sealing rings, as well as the drive mechanism for the valve turret, is eliminated.

Another object is to relieve undue pressure within the valve housing by returning fluid under pressure escaping into the same to the pressure treating chamber through the valve during the operation of the same.

Another object is to gradually diminish the pressure developed in the valve housing to thereby maintain a mean pressure differential between the valve housing and the treating chamber and to minimize the leakage between the two while at the same time the friction between the sealing ring and the turret is reduced to permit more freedom of rotation of the latter.

Another object is to utilize fluid pressure heating medium leaking from the pressure treating chamber into the valve housing to preheat articles fed by the latter while returning a portion of the fluid pressure heating medium to the chamber.

Other objects and advantages will become more apparent from the following description and drawings in which:

Fig. 1 is a side view of the valve of the present invention.

Fig. 2 is a section of Fig. 1 taken along line 2—2 thereof.

Fig. 3 is a vertical section of the valve taken along line 3—3 of Fig. 2.

Fig. 4 is a section through a portion of the valve taken along line 4—4 in Fig. 3.

Fig. 5 is a fragmentary section similar to Fig. 2 but showing a modification of the present invention.

Referring to the drawings 1 designates the shell or casing of a pressure cooker forming a pressuretight treating chamber 2 wherein articles, such as containers, to be processed are subjected to a heating medium such as steam under pressure. The shell 1 is provided with an opening 3 and a valve supporting casting 4 is secured thereto adjacent said opening in any conventional manner such as by rivets 5 or the like. The valve supporting casting 4 is provided with a machined valve mounting surface 6 having an opening 7.

The valve proper comprises a valve housing 10 having side plates 11 and 12 and an annular wall 13 to which the side plates are secured by means of cap screws 14 in a manner to provide a pressure tight valve housing. The valve housing is further provided with a flange 16 by which the housing is secured to the valve supporting casting 4 by means of cap screws 17. A gasket 18 interposed between the flange 16 and the surface 6 of the casting 4 is provided to establish a pressure tight seal between the valve and the treating chamber 2. The flange 16 is so disposed with respect to the valve housing that the latter extends through the opening 7 of the casting 4 and into the treating chamber 2. The upper portion of the annular wall 13 of the valve housing is provided with an inlet opening 20 while the lower portion of the annular wall is provided with an outlet opening 22 which established communication between the valve housing and the treating chamber 2.

Each side plate 11 and 12 is provided with a bearing 23 within which a shaft 24 is rotatably mounted. Each bearing 23 is provided with a stuffing box 25 for establishing a pressure tight seal between the shaft 24 and the housing 10. The shaft 24 is driven by any suitable drive mechanism, for instance such as the one disclosed in the aforementioned reissued patent.

Keyed to the shaft 24 for rotation within the housing 10 is a turret 30 comprising a hub portion 31, a central web portion 32 and an annular portion 33 provided with spaced side walls 34 and 35 and transverse partitions 36 forming a plurality of can receiving pockets 37 at the periphery of the turret 30 which are open toward the inner surface of the annular wall 13 of the housing 10.

The hub portion 31 (Fig. 2) extends from the side plate 11 to the side plate 12 of the valve housing 10 so as to center the turret 30 therebetween and the width of the annular portion of the turret is narrower than the axial length of the hub portion to provide a space 38 within the valve housing on either side of the turret 30.

Arranged on each side of the turret in the spaces 38 is a sealing ring 39 which is split as shown at 40 (Fig. 3) and adapted to expand into sealing engagement with the inner surface of the annular wall 13.

Arranged circumferentially on the side walls 11 and 12 opposite the sealing rings 39 are a plurality of glands each provided with a recess 41 and seated in the recess of each gland is a compression spring 42 which bears against the respective sealing ring with sufficient pressure to effect a substantial pressuretight seal between the turret pockets 37 and the spaces 38 within the housing. As best seen in Fig. 1, the recesses 41 in the lower portion of the side plates, i. e. adjacent the chamber 2, are formed in an arcuate embossment 43 which projects from the outside wall of the respective side plates for purposes of assembly. The recesses in the embossments 43 are closely spaced with respect to each other so as to assure a uniform seal, between the rings and turret for withstanding the high pressure exerted on the ring in the zone adjacent the treating chamber 2. The recesses 41 in the upper portion of the side plates are formed in separate plugs 44 which receive and hold the compression springs 42 and are threadedly secured to the respective side plates during the latter phases of assembly of the housing to press the sealing rings into sealing engagement with the turret. Each sealing ring (Fig. 2) is provided with a hole 45 into which extends the reduced end of a set screw 46 threadedly secured to one of the gland plugs 44 on each side of the valve housing and held in locked position by a lock nut so as to prevent rotation of the sealing rings relative to the valve housing but permitting lateral movement of the rings into sealing engagement with the turret and expansion of the rings into sealing engagement with the inner surface of the annular wall of the valve housing.

Each transverse partition 36 between the pockets 37 of the turret has a groove 47 which extends transversely of the turret and arranged within each groove is a flat spring 48 and a sealing strip 49 which extends into contact with each sealing ring and is urged against the inner surface of the annular wall 13 by the spring 48 to thereby seal the pockets 37 from each other to prevent leakage around the periphery of the turret.

The inlet opening 20 and outlet opening 22 hereinbefore referred to are substantially the same width as the interior of the pockets 37 as seen in Fig. 4, that is, from inside to inside of walls 34 and 35 of the turret, to leave along the sides of the openings 20 and 22 sufficient ledges 52 against which the outer ends of the packing strips 49 bear while passing the openings.

Referring to Fig. 3 it will be seen that if the valve is used as a feed valve the containers are fed through the inlet opening 20, are received by the pockets 37 and are transferred, as the turret rotates clockwise, to the outlet opening 22 through which they are discharged from the valve housing into the chamber 2. It will be understood, however, that if the valve is used as a discharge valve it is so arranged relative to the chamber 2 that the containers are received from the treating chamber through the opening 22 and are advanced by the pockets 37 to the opening 20 for discharge therethrough.

Although the spaces 38 on either side of the turret 30 are sealed from the exterior of the housing, the pressure in spaces 38 when the apparatus begins to operate is normally substantially the same as the pressure prevailing in the zone to which the opening 20 is exposed. Consequently, as the apparatus begins operating there is a pressure differential between the chamber 2 and the spaces 38 which pressure differential when in excess of the sealing capacity of the rings 39 induces leakage of fluid under pressure from the chamber into the spaces 38.

It will be noted in Figs. 2 and 3 that the two spaces 38 are in communication with each other through openings 56 formed in the central web 32 and, consequently, any pressure developing within the housing will be equalized on either side of the turret. However, as the pressure in the treating chamber increases the pressure differential between the treating chamber and the valve housing becomes greater and, consequently, induces a greater rate of leakage of fluid pressure from the chamber into the housing. Therefore, as pressure develops in the housing, the pressure differential between the chamber and housing is gradually lowered and the rate of leakage from the treating chamber into the housing decreases accordingly until the pressure in the valve housing 10 is substantially equalized with the pressure in the chamber. Thereafter, further leakage of pressure into the valve housing will occur only as the pressure therein is lowered, as, for instance, by leakage from the valve housing through the inlet opening 20 due to the pressure differential prevailing between the interior of the valve housing and the inlet portion thereof.

It will be noted that the outside face of each packing ring 39 is exposed to the fluid pressure in the space 38 and accordingly a corresponding pressure is applied to each ring in the direction of the arrows $a$ (Figs. 2 and 5) thereby pressing the ring against the side wall of the turret with greater force than the normal pressure of the compression springs 42. It is, therefore, apparent that during operation of the cooker valve the packing rings are forced into sealing engagement with the turret by the fluid pressure prevailing within the housing and that as the pressure in the housing increases the sealing capacity of each ring accordingly becomes more efficient thereby resulting in a lower rate of leakage from the chamber to the housing.

Although the increased efficiency of the packing ring is advantageous from the standpoint of lowering the rate of leakage, it will be noted that as the pressure in the spaces 38 increases the sealing efficiency of the packing rings, the friction between the turret and rings also increases so that the latter exert a brake-like action against the turret tending to retard its rotation. Consequently, as the friction between the rings and turret increases there is greater resistance against rotation of the turret thus requiring more power in order to continue rotation of the turret at the desired number of revolutions per minute.

In order to overcome and prevent undue friction between the rings and turret without completely losing the increased sealing efficiency caused by the fluid pressure upon the packing, the side plate 12 has a port 60 formed therethrough in communication with the space 38 on one side of the valve housing. Secured to the side plate 12 by cap screws 61 is the flanged end of an elbow 63 forming one end of a conduit or tube 64 to communicate the latter with the port 60. The conduit 64 extends substantially radially with respect to the housing 10 and parallel to the plate 12 and has a 90° bend 65 adjacent the edge of the side plate so as to extend crosswise relative to the annular wall 13. The conduit 64 terminates in an elbow 66 having a flanged end which is secured by cap screws 67 to a milled surface 68 on the annular wall 13 and in alignment with a port 70 formed through the wall 13 to connect the conduit with the periphery of the turret.

The port 70 establishes communication between the conduit 64 and a pocket 37 as soon as such pocket moves out of registration with the opening 20 and an adequate seal is established by the sealing strip 49 at the trailing end of the pocket. Since the pocket referred to is now sealed within the housing and has just left communication with the inlet portion thereof, there is a pressure differential between the spaces 38 and such pocket. Consequently, the pressure in the spaces 38 and the pocket 37 in communication therewith is equalized thereby relieving the pressure in the spaces 38 to a limited extent.

Since the turret is constantly rotated clockwise, Fig. 3, it is apparent that the pockets successively relieve the pressure within the spaces 38 by limited and controlled discharges of fluid under pressure into the pockets as they successively pass the port 70 thereby constantly diminishing the pressure within the spaces 38 while checking a complete exhaustion of the pressure therefrom.

The constant diminution of pressure in the spaces 38 lowers the sidewise pressure of the packing against the side walls of the turret thereby reducing the friction between the turret and the sealing rings thus decreasing the load of the turret drive mechanism. However, it will be noted that the pressure in the spaces 38 is not completely exhausted but is maintained within a range compatible to a mean pressure differential between the chamber 2 and spaces 38 whereby the sealing rings will be forced into effective sealing engagement with the turret by the pressure prevailing in the spaces 38 and therefore will permit relatively little leakage around the sealing rings due to pressure differential while permitting more freedom of movement of the turret. It therefore follows that the constant and measured discharges of fluid under pressure from spaces 38 through the pockets 37 while maintaining a mean pressure differential between the chamber and the spaces 38 prevents excessive pressure in spaces 38 and, consequently, the frictional engagement between the sealing ring and turret is maintained at a minimum permitting more freedom of movement of the turret.

It will be apparent from an examination of Fig. 3 that in valves of the general type embraced by the present invention there is a constant or fixed loss of pressure through the pockets as they pass from registration with outlet opening 22 at the pressure chamber 2 into communication with the inlet opening 20. Although steam under pressure leaking into the space 38 would be a loss in addition to said fixed loss, by the present arrangement, that portion of the fluid pressure of which the spaces 38 are relieved is by-passed into the pockets 37 as they approach the pressure chamber. The pockets are, therefore, partially occupied by recaptured fluid pressure when they arrive at the outlet opening 22 and, consequently, the amount of steam under pressure passing from the chamber 2 into the pockets as they begin to approach the inlet opening 20 is reduced.

Since the fluid pressure relieved from the spaces 38 to reduce friction between the rings and turret is directed into the pockets 37 as they approach the chamber, such pressure provides a portion of the pressure which would otherwise enter the pockets 37 upon registration thereof with the opening 22 and, therefore, the fluid pressure of which the valve housing is relieved is not a loss in addition to the fixed loss of fluid pressure through the outgoing pockets, but is utilized to lower the fixed loss, and, accordingly, accomplishes a saving of fluid pressure.

As a result of the foregoing control over the development of pressure in the spaces 38, there is less frictional wear of the packing rings, and, accordingly, they need not be replaced so often. Less horsepower is needed to drive the turret; and there is less wear of the drive mechanism due to the reduction of the load thereon. In addition to the above advantages it will also be noted that when the valve of the present invention is used as a feed type valve, the fluid pressure heating medium entering the pockets 37 as they register with the port 70 has a preheating effect on the articles in the pockets as they advance toward the pressure treating chamber and, consequently, will minimize shock to the articles, especially in cases where the articles are cans containing a substance, such as milk, which is highly sensitive to sudden temperature changes caused by an abrupt introduction of the same into the pressure heating medium in the chamber 2.

In the modification shown in Fig. 5, both operation and result are the same as in the device illustrated in Figs. 2 and 3 and parts in common therewith are identified by the same reference numerals. However, in this modified structure the turret 80 is of such construction that it would be impractical to provide openings through the central web of the turret in order to equalize the pressures of the two spaces 38. In valves of this character, both side plates 11 and 12 have a port 60 formed therethrough in communication with the respective spaces 38. A U-shaped conduit 84 straddles the housing 10 with parallel portions 85 of the conduit on either side of the housing. Elbowed ends 83 of the portions 85 are connected to the respective side plates in alignment with the ports 60 and are secured to the respective side plates 11 and 12 by cap screws 81 thereby establishing communication between the two spaces 38 to equalize the pressures therein. The portion 85' of the conduit joining the parallel portions 85 thereof is disposed transversely and parallel to the annular wall 13 and has an outlet portion 86 extending therefrom and terminating in a flanged end secured by cap screws 87 to a milled surface 88 on the annular wall 13 to connect the conduit 84 to the wall 13 in alignment with the port 70 and establish communication between the latter and the conduit. It is therefore apparent that pressure in the two spaces 38 is diminished in the same manner and for the same purpose as hereinbefore explained in regard to the construction shown in Figs. 2 and 3. At the same time the fluid under pressure of which the housing 10 is relieved is recaptured and utilized to lower the fixed loss of fluid pressure through the outgoing pockets 37.

While the improvements in valves for pressure treating chambers described and shown herein have been specifically defined, it will be appreciated by those skilled in the art that various modifications and alterations may be resorted to without departing from the spirit of the invention. I desire it to be understood, therefore, that I consider myself entitled to such modifications and variations as fall within the scope of the claims appended hereto.

Having thus described the construction of an improved valve for pressure treating chambers, what I claim as new and desire to protect by Letters Patent is:

1. A valve for admitting articles to or discharging them from a pressure treating chamber, comprising a housing having an opening communicating with said chamber and an opening communicating with the exterior of said chamber, a rotating turret in said housing and narrower than the same to provide interior spaces on either side thereof, said turret having an article carrying pocket movable from one to the other of said openings and having sealing strips across its periphery for preventing leakage along the same from one to the other of said openings, sealing means intermediate said turret and housing and normally urged against the turret for sealing said pocket relative to the interior spaces in said housing, said sealing means being spaced from the inner walls of said housing so as to be subjected to fluid pressure leaking from said chamber into the interior spaces of said housing for augmenting the sealing efficiency of said sealing means relative to said turret in proportion to the pressure prevailing in said chamber, and means for equalizing the pressure in the interior spaces in said housing and pocket to prevent excessive friction between the sealing means and the turret.

2. A valve for admitting articles to or discharging them from a pressure treating vessel, comprising a housing having an opening communicating with said vessel and an opening communicating with the exterior of said vessel, a rotating turret disposed in said housing in spaced relation to the side walls thereof to provide an internal chamber between the sides of the turret and the inner walls of said housing, said turret having an article carrying pocket movable from one to the other of said openings and being provided with peripheral sealing strips for preventing leakage of pressure along the periphery of the turret, sealing means in said chamber intermediate said turret and housing and normally urged against the turret for sealing said pocket relative to the internal chamber, said sealing means being spaced from the inner walls of said housing so as to be subjected to fluid pressure leaking from said vessel into the internal chamber whereby said sealing means is forced against said turret for increasing the sealing capacity of said sealing means, and a conduit for communicating the internal chamber with said pocket during its movement between said openings for periodically reducing the fluid pressure acting upon said sealing means to thereby prevent excessive friction between the sealing means and the turret.

3. In a valve for admitting articles to or for discharging them from a pressure treating chamber, the combination with a housing provided with an annular surface and having inlet and outlet openings therein and enclosing a rotating turret disposed in spaced relation to the side walls of said housing to provide a compartment therein, said turret having an article carrying pocket in its periphery alternately communicable with the interior and exterior of said chamber through said openings, and means associated with said turret for effecting a seal between the annular surface of said housing and the periphery of said turret, sealing means disposed in said compartment intermediate the side walls of said housing and the turret and normally held against the turret for preventing excessive escape of fluid pressure from the interior to the exterior of said chamber other than by way of said pocket, said sealing means being spaced from the side walls of the housing so as to be subjected to fluid pressure escaping into the same for increasing the sealing efficiency of said sealing means; of pressure relief means comprising a conduit communicating with said compartment and extending from one side of said housing to the periphery thereof for conducting a portion of the fluid pressure within said housing to said pocket as it passes between said inlet and outlet openings toward said chamber thereby reducing the pressure acting upon said sealing means in the compartment to prevent excessive friction between the sealing means and said turret.

4. A valve for admitting articles to or discharging them from a pressure treating chamber, comprising a housing having an opening communicating with the interior of said chamber and an opening communicating with the exterior of the chamber, a rotating turret arranged in said housing to leave a clearance space between either side of the turret and said housing, said turret having an article carrying pocket for transferring articles from one to the other of said openings and having peripheral sealing strips for preventing leakage of pressure along the periphery of said turret, a sealing ring narrower than and within each of said clearance spaces and normally held against the sides of said turret, said sealing rings being expansible into engagement with the inner peripheral wall of said housing and pressed against said turret by fluid pressure within said clearance spaces due to leakage of pressure thereinto from said chamber whereby the sealing rings are forced into sealing engagement with the turret, and conduits connecting said clearance spaces with said pocket as it approaches said chamber for equalizing the fluid pressures in the spaces and pocket to maintain a mean pressure differential between the spaces and chamber and to prevent excessive friction between said sealing rings and turret.

5. A valve for a pressure treating chamber comprising a housing having an inlet and an outlet opening, one communicating with the interior of said chamber and the other communicating with the exterior of the chamber, a rotary turret in said housing having a pocket for receiving an article therein when said pocket is in registration with the inlet opening of said housing and for discharging the article therefrom when the pocket is in registration with the outlet opening of the housing, said turret having sealing strips in its periphery for preventing leakage of pressure therealong from the interior to the exterior of said chamber, an expansible and laterally movable sealing ring intermediate said housing and turret at each side thereof and narrower in width than the spaces intermediate the turret and side walls of the housing, means for normally holding said sealing rings against said turret with a minimum of pressure, said sealing rings being pressed into sealing engagement with said turret by fluid pressure accumulating within the interior of said housing due to leakage of fluid pressure from said chamber, and means for establishing communication between the interior of said housing and the pocket while it is in transit between said openings and approaching said chamber to relieve the fluid pressure acting on said sealing ring and prevent undue friction between said sealing ring and turret without loss of fluid pressure.

6. A valve for admitting articles to or discharging them from a pressure treating chamber, comprising a housing provided with an annular surface having an opening communicating with the interior of said chamber and an opening communicating with the exterior of the chamber, a rotating turret in said housing intermediate the side walls thereof and having an article carrying pocket in its periphery for transferring articles from one to the other of said openings, means for sealing said pocket relative to the interior of said housing including sealing strips between the annular surface of said housing and the turret and sealing rings between the side walls of the housing and the turret expansible into sealing engagement with the annular surface of said housing, means for holding said sealing rings in contact with the turret and in spaced relation to the side walls of the housing, said sealing rings being subjected to fluid pressure leaking from said chamber into the interior of said housing whereby said rings are forced into sealing engagement with the turret, and a conduit for communicating the interior of said housing on either side of said turret with said pocket as it approaches said chamber whereby the pressures in the housing and pocket are equalized thereby reducing the fluid pressure acting upon said sealing rings to prevent excessive friction between the latter and said turret and preheating articles carried by said pockets while returning fluid under pressure to said chamber.

FRANK L. BOTELHO.

REFERENCES CITED

The following references are of record in the file of this patent:

UNITED STATES PATENTS

| Number | Name | Date |
| --- | --- | --- |
| 1,327,540 | Fooks | Jan. 6, 1920 |
| 1,589,452 | Bach | June 22, 1926 |
| 1,808,017 | Chapman | June 2, 1931 |
| 1,978,656 | Thompson | Oct. 30, 1934 |
| 2,393,997 | Lehmann | Feb. 5, 1946 |